(12) United States Patent
Kobayashi

(10) Patent No.: US 6,422,699 B2
(45) Date of Patent: Jul. 23, 2002

(54) ADJUSTABLE NOSE PAD STRUCTURE FOR EYEGLASSES

(75) Inventor: Chieko Kobayashi, Fukui (JP)

(73) Assignee: Kobayashi Co., Ltd., Fuku-Ken (JP)

( * ) Notice: Subject to any disclaimer, the term of this patent is extended or adjusted under 35 U.S.C. 154(b) by 0 days.

(21) Appl. No.: 09/796,462

(22) Filed: Mar. 2, 2001

(30) Foreign Application Priority Data

Mar. 6, 2000 (JP) ....................................... 2000-001264

(51) Int. Cl.[7] ................................................. G02C 5/12
(52) U.S. Cl. ....................................... 351/136; 351/137
(58) Field of Search ................................ 351/136, 137, 351/138, 78, 80

(56) References Cited

U.S. PATENT DOCUMENTS

| 375,541 A | * 12/1887 | Eccleston et al. ........... 351/138 |
| 3,923,385 A | * 12/1975 | Ahern, Jr. .................... 351/132 |
| 4,500,179 A | * 2/1985 | Schonhut .................... 351/137 |

FOREIGN PATENT DOCUMENTS

JP 1-152320 10/1989

* cited by examiner

*Primary Examiner*—Huy Mai
(74) *Attorney, Agent, or Firm*—Wenderoth, Lind & Ponack, L.L.P.

(57) ABSTRACT

Disclosed is an adjustable nose pad structure comprising a traverse having two legs at its opposite ends sized and shaped so as to be applied at least partially to the nose, and fixing structure for fixing the traverse to the rear side of the bridge of the eyeglasses. The fixing structure comprises a series of passage-communicating hollow divisions made in the free end length of each leg and two male projections integrally connected to the bridge or rim in the vicinity of each bridge-to-rim transition. These male projections can be inserted in the passage-communicating hollow divisions, so that the traverse may be fixed to the bridge or either rim of the eyeglasses at a controlled distance from the front of the eyeglasses to fit the eyeglasses to a face.

18 Claims, 5 Drawing Sheets

ADJUSTABLE NOSE PAD STRUCTURE FOR EYEGLASSES

BACKGROUND OF THE INVENTION

1. Field of the Invention

The present invention relates to eyeglasses, and more particularly to a nose pad structure for eyeglasses.

2. Related Art

Japanese Utility Model H01-152320(A) discloses a nose pad structure for eyeglasses, which comprises a pair of leg-attached cases each having a pad loosely fitted therein. Each leg-attached case is fixed to the rear side of the rim by soldering the leg of the leg-attached case to the rim in the vicinity of the bridge.

When fitting the eyeglasses having such nose pad structure soldered to its rims to one's face, it is necessary that the legs of the leg-attached cases be reshaped so as to adjust the distance between the front of the eyeglasses and the nose dependent on the height of the nose. The leg of each leg-attached case, therefore, is shaped so as to facilitate such adjustment. As a matter of fact, however, the bending or twisting of the leg of the leg-attached case is apt to break or deform the leg of the leg-attached case. It is not rare that the leg-attached case comes off from the rim as the soldering is destroyed.

The leg shape is intricate. The pad is loosely fitted in the case, thereby permitting the pad to move in the case. For these reasons oil is liable to stick to the root of the leg and the inside of the case, and it is difficult to clean the eyeglasses frame by removing the stain of oil from such intricate and small parts. Thus, the appearance of eyeglasses is apt to be less pleasing and lessen with age.

SUMMARY OF THE INVENTION

One object of the present invention is to provide an improved nose pad structure for eyeglasses which can be fixed to the front of the eyeglasses easily without soldering, and can be adjusted in terms of the front-to-nose distance dependent upon the height of the nose, thus permitting those who work for eyeglasses shops to fit individual customers with their new eyeglasses.

To attain this object a nose pad structure for eyeglasses according to the present invention comprises a traverse having two legs at its opposite ends sized and shaped so as to be applied at least partially to the nose, and fixing structure for fixing the traverse to the rear side of the bridge of the eyeglasses.

The fixing structure may comprise a series of passage-communicating hollow divisions made in the free end length of each leg and two male projections integrally connected to the bridge or rim, in the vicinity of each bridge-to-rim transition, to be inserted in the passage-communicating hollow divisions, whereby the traverse may be fixed to the bridge or rim of the eyeglasses at a controlled distance from the front of the eyeglasses to fit the eyeglasses to the face.

The traverse having two legs at its opposite ends may be an "M"- or "U"-shaped synthetic resin, and is so small in size that it may be hidden behind the bridge.

The traverse may have two opposite legs cut to be of so controlled length that the eyeglasses may fit to the face, dependent on the height of the nose.

Each male projection is long enough to reach the end of the series of passage-communicating hollow divisions, thus permitting the traverse to be apart from the front at a controlled distance by adjusting the insertion depth of the male projection in the series of passage-communicating hollow divisions.

Other objects and advantages of the present invention will be understood from the following description of a nose pad structure according to two preferred embodiments of the present invention, which are shown in accompanying drawings.

BRIEF DESCRIPTION OF THE DRAWINGS

FIG. 1($b$) is a plan view of the eyeglasses; and

FIG. 1($c$) is a front view of the eyeglasses;

DETAILED DESCRIPTION OF PREFERRED EMBODIMENTS

Figure 1A:
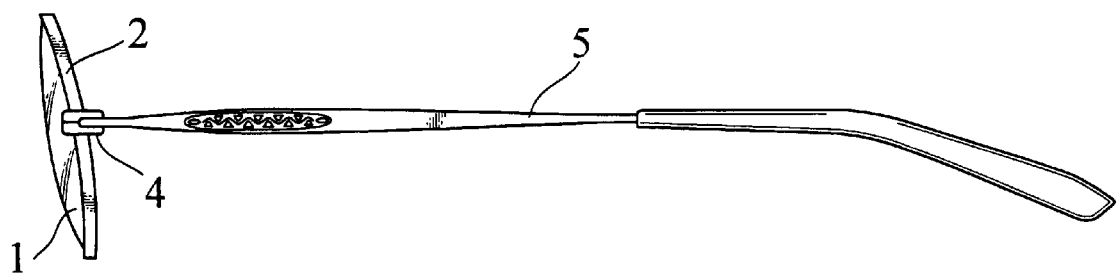
FIG. 1($a$) is a side view of eyeglasses having a nose pad structure according to the present invention.
Figure 1B:
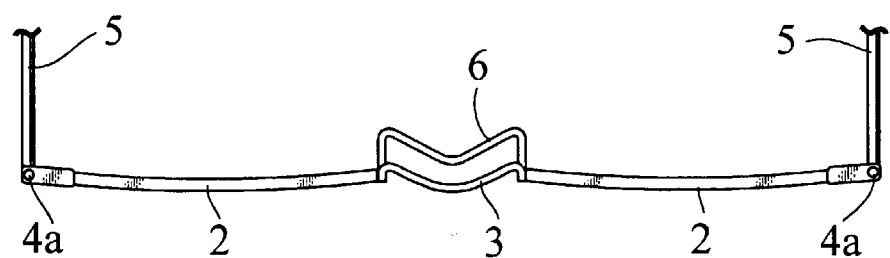
Figure 1C:
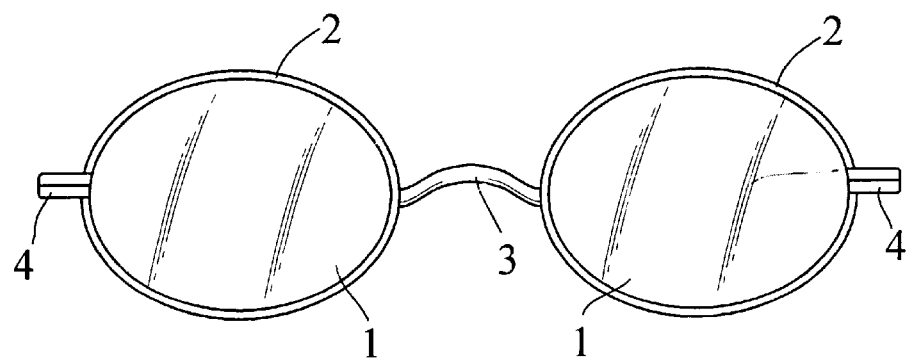

Referring to FIGS. 1 to 5, a pair of eyeglasses uses a nose pad structure according to a first embodiment of the present invention. The pair of eyeglasses comprises a pair of rims 2 connected by a bridge to make up the front, two temples 5 and 5 hinged to the rims 2 via joint pieces 4 and 4, and two lenses 1 and 1 each held by the rims.

The lens 1 is made of glass or plastic material, and the lens 1 has a ridge (not shown) formed on its circumference. The rim 2 is made of titanium, nickel, an alloy of such metals, a shape memory alloy or any other appropriate metal or alloy, and the rim 2 has a groove (not shown) made on its inner circumference. The circumferential ridge of the lens 1 is press-fitted in the circumferential groove of the rim, so that the lens 1 may be firmly held by the rim 2.

Figure 2:
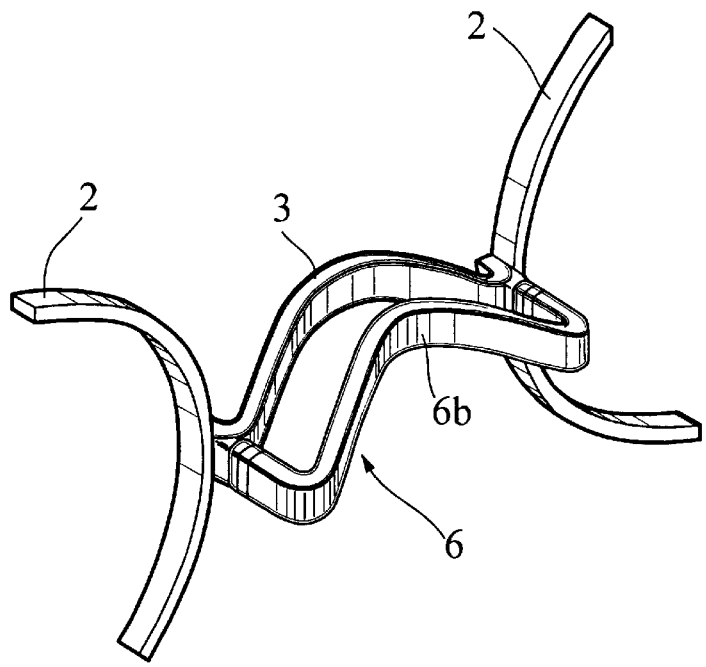
FIG. 2 is a perspective view of a nose pad structure according to a first embodiment of the present invention.
Figure 3:
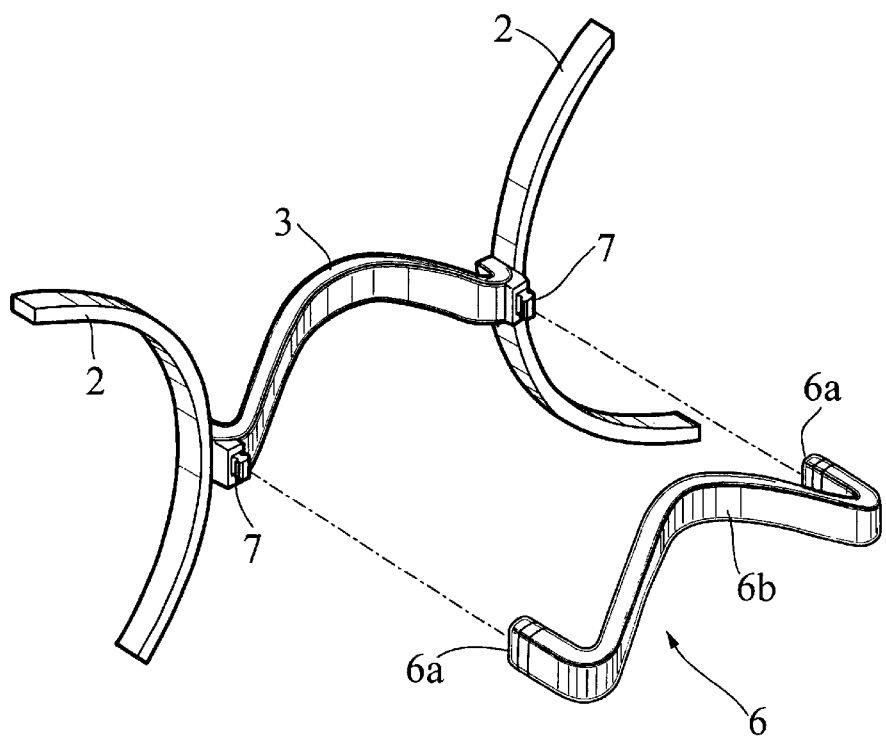
FIG. 3 illustrates how the nose pad structure of the first embodiment is fixed to the bridge.

As seen from FIG. 2, the bridge 3 has an "M"-shaped nose pad structure 6 applied to its rear side. It comprises a traverse 6$b$ having two legs integrally connected to its opposite ends, and is made of rubber, synthetic resin or any other appropriate material. The traverse 6$b$ is bent outward so that it may ride closely on the nose. Each leg has a series of hollow divisions 6$c_1$, 6$c_2$ and 6$c_3$ made in its free end 6$a$. These hollow divisions 6$c_1$, 6$c_2$ and 6$c_3$ communicate with intervening passages. A counter male projection 7 is formed on each bridge-to-rim transition to be inserted in a selected hollow division. Thus, the nose pad structure 6 can be detachably fixed to the bridge 3 on its rear side. This arrangement permits the distance from the bridge to the nose to be adjusted dependent on the height of the nose to fit the face with the eyeglasses, as later described in detail.

Figure 4:
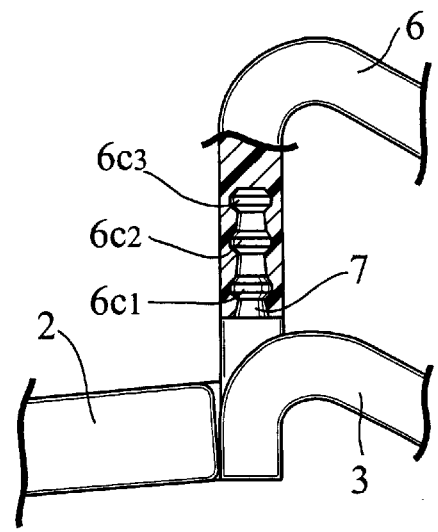
FIG. 4 illustrates, partly in section, the manner in which the leg of the nose pad structure of the first embodiment is fixed to one end of the bridge.
Figure 5:
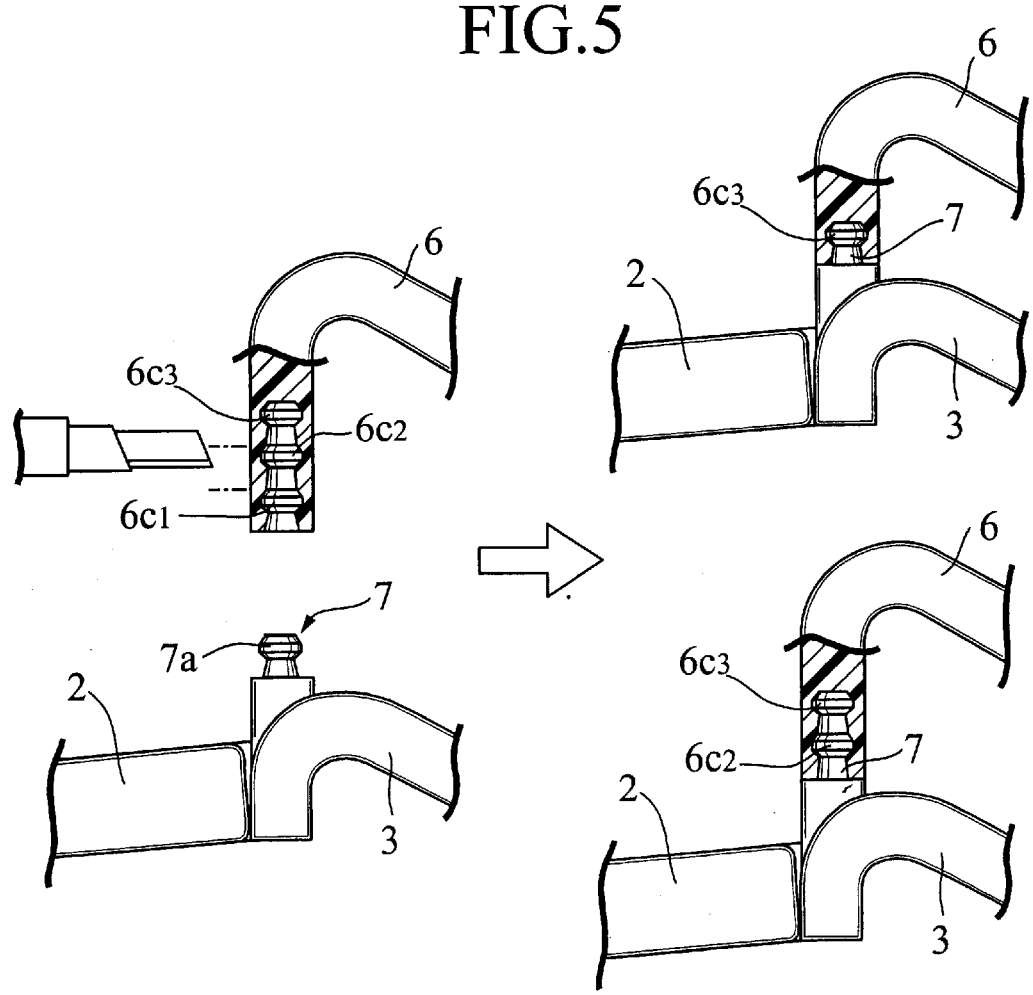
FIG. 5 illustrates how the front-to-nose distance can be adjusted to fit the eyeglasses to the face.

Referring to FIGS. 4 and 5, three hollow divisions $6c_1$, $6c_2$ and $6c_3$ are made in the free end of each leg. These hollow divisions communicate with intervening narrow passages, and the first hollow division $6c_1$ opens at the end of the leg whereas the third hollow division $6c_3$ is a blind hole. A required adjustment can be effected by determining with which hollow division the counter male projection 7 is mated. Thus, the eyeglasses can be fitted to the face by making a selection among three different positions of the eyeglasses relative to the face. Specifically the free end 6a of the leg is cut at a selected notch to remove unnecessary hollow division or divisions from the leg, thereby retaining the passage to a selected hollow division. The eyeglasses can be made to fit to the face by inserting each male projection 7 into the so selected hollow division of the leg.

The joint piece 4 is made of titanium, nickel or any other appropriate metal or alloy, and is soldered to the outer edge of each rim 2. Each temple 5 is hinged to the joint piece 4 so that it may be folded on the front of the eyeglasses.

As may be understood from the above, the nose pad structure can be detachably fixed to the bridge, requiring no soldering. The nose pad structure can be changed easily for a new one when stained.

Three stages of positional adjustment can meet almost all faces to accommodate the eyeglasses. The nose pad structure is hidden behind the bridge, giving a neat shape to the rim-to-rim connection of the front.

FIGS. 6 to 9 show a nose pad structure according to a second embodiment of the present invention. In these drawings same parts are indicated by same reference numerals as used in describing the first embodiment, and descriptions of such parts are omitted.

Figure 6:
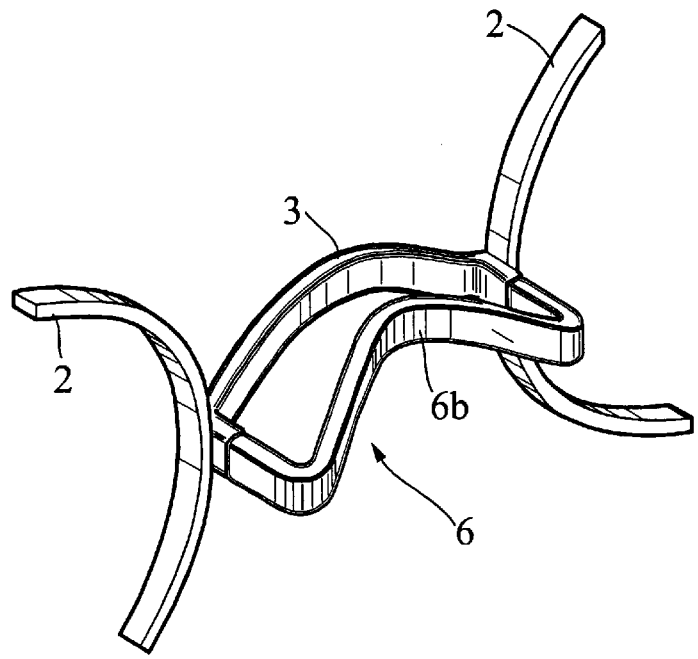
FIG. 6 is a perspective view of a nose pad structure according to a second embodiment of the present invention.
Figure 7:
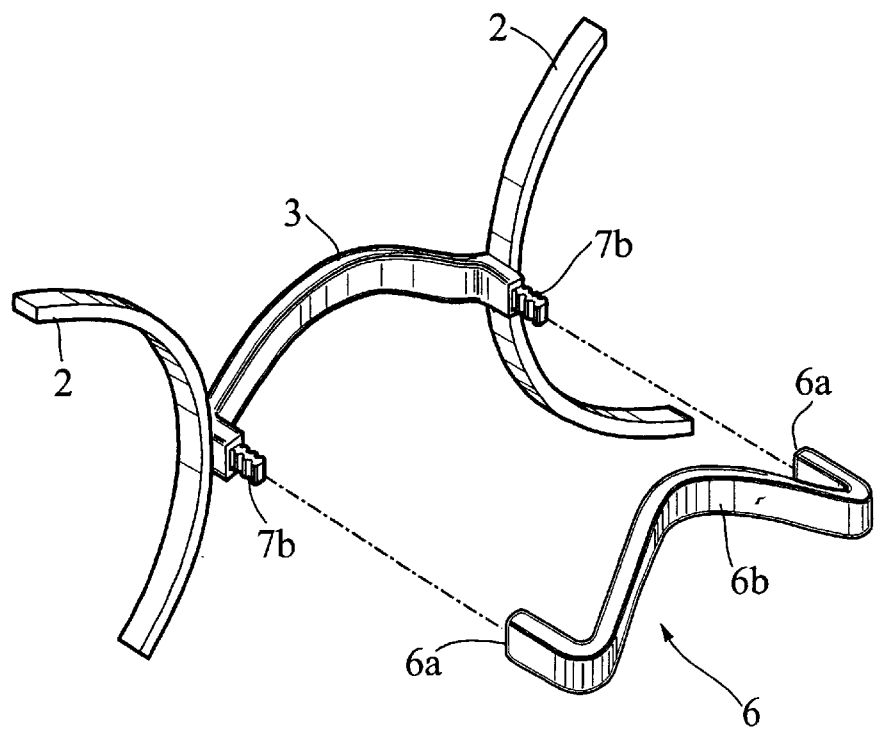
FIG. 7 is an exploded perspective view of the nose pad structure of the second embodiment, illustrating how it can be fixed to the bridge.
Figure 8:
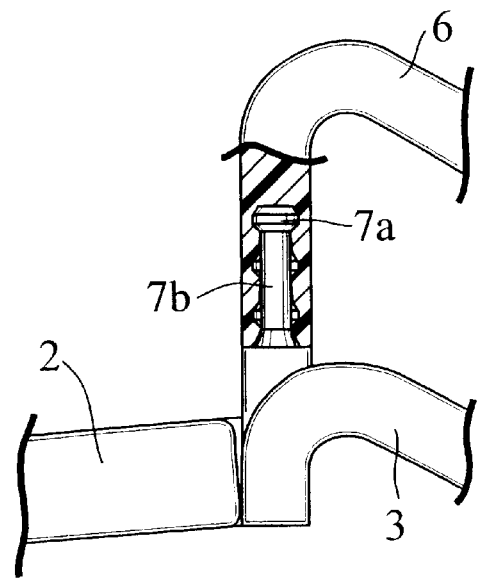
FIG. 8 illustrates the nose pad structure of the second embodiment fixed at its closest position, partly in section.
Figure 9:
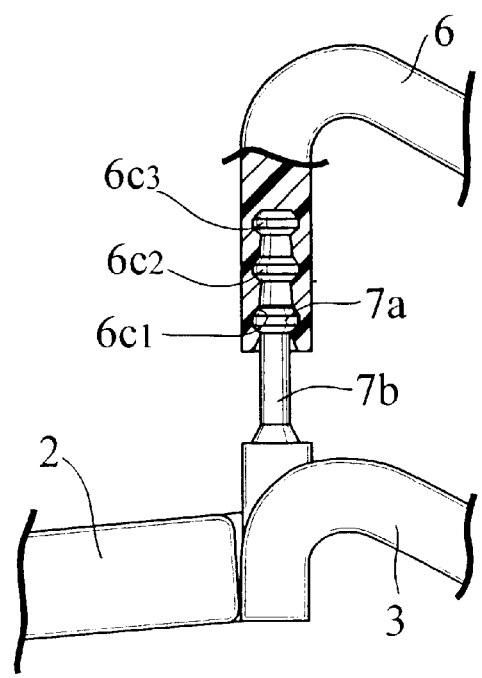
FIG. 9 illustrates the nose pad structure of the second embodiment fixed at its most remote position, partly in section.

Referring to FIG. 6, the bridge 3 has elongated male projections 7b formed on its opposite ends. Each leg of the traverse 6 has three hollow divisions $6_{c1}$, $6c_2$ and $6c_3$ made therein, and a required adjustment can be made by selecting which hollow division accommodates the enlarged end of the elongated male projection 7b. Specifically the front of the eyeglasses can be put closest to the face by allowing the enlarged end 7a of the male projection to mate with the innermost hollow division $6c_3$ (see FIG. 8) whereas the front of the eyeglasses can be put most remote from the face by allowing the enlarged end 7a of the male projection to mate with the outermost hollow division $6c_1$ (see FIG. 9). The cutting and removing of the extra length from the leg in the first embodiment is not required.

The embodiments described above can be modified within the spirit of the present invention as, follows: the opposite legs of the traverse may be fixed to the rims rather than the bridge; and the nose pad structure can be applied to rimless eyeglasses or any other types of eyeglasses, provided that their lenses are connected via bridges.

As may be understood from the above, the nose pad structure according to the present invention has a small number of parts to be assembled, and accordingly, the number of manufacturing steps, and hence the manufacturing cost can be reduced. The nose pad structure can be attached to the eyeglasses with ease, compared with the conventional nose pad structure having nose pads loosely contained in its cases, requiring that two leg-attached cases be soldered to the opposite ends of the bridge.

Those who work for eyeglasses shops can fit customers with their new eyeglasses without difficulty. When the nose pad structure is stained, it can be changed readily because no soldering is required in changing.

The nose pad structure is completely hidden behind the bridge, giving a pleasing neatness to the eyeglasses when worn on the face.

The required adjustment can be easily effected simply by cutting and removing the extra length from the leg or by controlling the insertion depth of the male projection in the series of hollow divisions made in the leg.

What is claimed is:

1. A nose pad structure for eyeglasses, comprising:
    a traverse that is sized and shaped so as to be at least partially receivable by the nose of a person, said traverse having a first end with a first leg thereat and also having a second end with a second leg thereat; and
    structure to fix said traverse to a rear side of a bridge of eyeglasses, wherein said structure to fix comprises
        (i) a first series of passage-communicating hollow divisions in said first leg,
        (ii) a second series of passage-communicating hollow divisions in said second leg,
        (iii) a first male projection that is to be integrally connected to the bridge of the eyeglasses or to a rim of the eyeglasses near the bridge, and is receivable within said first series of passage-communicating hollow divisions to a depth that extends in a direction toward and away from the face of the person when said traverse is received on the nose of the person, and
        (iv) a second male projection that is to be integrally connected to the bridge of the eyeglasses or to another rim of the eyeglasses near the bridge, and is receivable within said second series of passage-communicating hollow divisions to a depth that extends in a direction toward and away from the face of the person when said traverse is received on the nose of the person,
    such that said traverse can be attached to the eyeglasses and spaced from the bridge of the eyeglasses by a controlled distance via receipt of said first male projection in said first series of passage-communicating hollow divisions and receipt of said second male projection in said second series of passage-communicating hollow divisions, whereby the eyeglasses can be adjusted to the face of the person.

2. The nose pad structure according to claim 1, wherein said traverse comprises an M-shaped or a U-shaped synthetic resin, and is of such a size such that said traverse can be hidden behind the bridge of the eyeglasses.

3. The nose pad structure according to claim 2, wherein said traverse can be attached to the eyeglasses and spaced from the bridge of the eyeglasses by the controlled distance by cutting said first leg to a first length and cutting said second leg to a second length, and then inserting said first male projection into said first series of passage-communicating hollow divisions and inserting said second male projection into said second series of passage-communicating hollow divisions.

4. The nose pad structure according to claim 3, wherein said first male projection has a length that is at least equal to that of said first series of passage-communicating hollow divisions and said second male projection has a length that is at least equal to that of said second series of passage-communicating hollow divisions such that said traverse can be attached to the eyeglasses and spaced from the bridge of the eyeglasses by the controlled distance by adjusting the depth to which said first male projection is inserted into said first series of passage-communicating hollow divisions and adjusting the depth to which said second male projection is inserted into said second series of passage-communicating hollow divisions.

5. The nose pad structure according to claim 3, wherein said first male projection is shorter in length than that of said first series of passage-communicating hollow divisions and said second male projection is shorter in length than that of said second series of passage-communicating hollow divisions.

6. The nose pad structure according to claim 2, wherein said first male projection has a length that is at least equal to that of said first series of passage-communicating hollow divisions and said second male projection has a length that is at least equal to that of said second series of passage-communicating hollow divisions such that said traverse can be attached to the eyeglasses and spaced from the bridge of the eyeglasses by the controlled distance by adjusting the depth to which said first male projection is inserted into said first series of passage-communicating hollow divisions and adjusting the depth to which said second male projection is inserted into said second series of passage-communicating hollow divisions.

7. The nose pad structure according to claim 2, wherein said first male projection is shorter in length than that of said first series of passage-communicating hollow divisions and said second male projection is shorter in length than that of said second series of passage-communicating hollow divisions such that said traverse can be attached to the eyeglasses and spaced from the bridge of the eyeglasses by the controlled distance by cutting said first leg to a first length and cutting said second leg to a second length, and then inserting said first male projection into said first series of passage-communicating hollow divisions to the depth that said first male projection is receivable within said first series of passage-communicating hollow divisions and inserting said second male projection into said second series of passage-communicating hollow divisions to the depth that said second male projection is receivable within said second series of passage-communicating hollow divisions.

8. The nose pad structure according to claim 1, wherein said first male projection has a length that is at least equal to that of said first series of passage-communicating hollow divisions and said second male projection has a length that is at least equal to that of said second series of passage-communicating hollow divisions such that said traverse can be attached to the eyeglasses and spaced from the bridge of the eyeglasses by the controlled distance by adjusting the depth to which said first male projection is inserted into said first series of passage-communicating hollow divisions and adjusting the depth to which said second male projection is inserted into said second series of passage-communicating hollow divisions.

9. The nose pad structure according to claim 1, wherein said first male projection is shorter in length than that of said first series of passage-communicating hollow divisions and said second male projection is shorter in length than that of said second series of passage-communicating hollow divisions such that said traverse can be attached to the eyeglasses and spaced from the bridge of the eyeglasses by the controlled distance by cutting said first leg to a first length and cutting said second leg to a second length, and then inserting said first male projection into said first series of passage-communicating hollow divisions to the depth that said first male projection is receivable within said first series of passage-communicating hollow divisions and inserting said second male projection into said second series of passage-communicating hollow divisions to the depth that said second male projection is receivable within said second series of passage-communicating hollow divisions.

10. Eyeglasses comprising:
a bridge;
a traverse that is sized and shaped so as to be at least partially receivable by the nose of a person, said traverse having a first end with a first leg thereat and also having a second end with a second leg thereat; and
structure to fix said traverse to a rear side of said bridge, wherein said structure to fix comprises
  (i) a first series of passage-communicating hollow divisions in said first leg,
  (ii) a second series of passage-communicating hollow divisions in said second leg,
  (ii) a first male projection that is integrally connected to said bridge or to a rim near said bridge, and is receivable within said first series of passage-communicating hollow divisions to a depth that extends in a direction toward and away from the face of the person when said traverse is received on the nose of the person, and
  (iv) a second male projection that is integrally connected to said bridge or to another one of said rims near said bridge, and is receivable within said second series of passage-communicating hollow divisions to a depth that extends in a direction toward and away from the face of the person when said traverse is received on the nose of the person,
such that said traverse can be spaced from said bridge by a controlled distance via receipt of said first male projection in said first series of passage-communicating hollow divisions and receipt of said second male projection in said second series of passage-communicating hollow divisions, whereby the eyeglasses can be adjusted to the face of the person.

11. The eyeglasses according to claim 10, wherein said traverse comprises an M-shaped or a U-shaped synthetic resin, and is such a size such that said traverse can be hidden behind said bridge.

12. The eyeglasses according to claim 11, wherein said traverse can be spaced from said bridge by the controlled distance by cutting said first leg to a first length and cutting said second leg to a second length, and then inserting said first male projection into said first series of passage-communicating hollow divisions and inserting said second male projection into said second series of passage-communicating hollow divisions.

13. The eyeglasses according to claim 12, wherein said first male projection has a length that is at least equal to that of said first series of passage-communicating hollow divisions and said second male projection has a length that is at least equal to that of said second series of passage-communicating hollow divisions such that said traverse can be spaced from said bridge by the controlled distance by adjusting the depth to which said first male projection is inserted into said first series of passage-communicating hollow divisions and adjusting the depth to which said second male projection is inserted into said second series of passage-communicating hollow divisions.

14. The eyeglasses according to claim 12, wherein said first male projection is shorter in length than that of said first series of passage-communicating hollow divisions and said second male projection is shorter in length than hat of said second series of passage-communicating hollow divisions.

15. The eyeglasses according to claim 11, wherein said first male projection has a length that is at least equal to that of said first series of passage-communicating hollow divisions and said second male projection has a length that is at least equal to that of said second series of passage-communicating hollow divisions such that said traverse can be spaced from said bridge by the controlled distance by adjusting the depth to which said first male projection is inserted into said first series of passage-communicating hollow divisions and adjusting the depth to which said second male projection is inserted into said second series of passage-communicating divisions.

16. The eyeglasses according to claim 11, wherein said first male projection is shorter in length than that of said first series of passage-communicating hollow divisions and said second male projection is shorter in length than that of said second series of passage-communicating hollow divisions such that said traverse can be spaced from said bridge by the controlled distance by cutting said first leg to a first length and cutting said second leg to a second length, and then inserting said first male projection into said first series of passage-communicating hollow divisions to the depth that said first male projection is receivable within said first series of passage-communicating hollow divisions and inserting said second male projection into said second series of passage-communicating hollow divisions to the depth that said second male projection is receivable within said second series of passage-communicating hollow divisions.

17. The eyeglasses according to claim 10, wherein said first male projection has a length that is at least equal to the of said first series of passage-communicating hollow divisions and said second male projection has a length that is at least equal to that of said second series of passage-communicating hollow divisions such that said traverse can be spaced from said bridge by the controlled distance by adjusting the depth to which said first male projection is inserted into said first series of passage-communicating hollow divisions and adjusting the depth to which said second male projection is inserted into said second series of passage-communicating hollow divisions.

18. The eyeglasses according to claim 10, wherein said first male projection is shorter in length than that of said first series of passage-communicating hollow divisions and said second male projection is shorter in length than that of said second series of passage-communicating hollow divisions such that said traverse can be spaced from said bridge by the controlled distance by cutting said first leg to a first length and cutting said second leg to a second length, and then inserting said first male projection into said first series of passage-communicating hollow divisions to the depth that said first male projection is receivable within said first series of passage-communicating hollow divisions and inserting said second male projection into said second series of passage-communicating hollow divisions to the depth that said second male projection is receivable within said second series of passage-communicating hollow divisions.

* * * * *